United States Patent
Dong et al.

(10) Patent No.: US 10,600,007 B2
(45) Date of Patent: Mar. 24, 2020

(54) AUTO-ANALYZING SPATIAL RELATIONSHIPS IN MULTI-SCALE SPATIAL DATASETS FOR SPATIO-TEMPORAL PREDICTION

(71) Applicant: International Business Machines Corporation, Armonk, NY (US)

(72) Inventors: Wei Shan Dong, Beijing (CN); Arun Hampapur, Norwalk, CT (US); Hongfei Li, Briarcliff Manor, NY (US); Li Li, Beijing (CN); Xuan Liu, Yorktown Heights, NY (US); Chun Yang Ma, Beijing (CN); Songhua Xing, Staten Island, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 1570 days.

(21) Appl. No.: 14/450,712

(22) Filed: Aug. 4, 2014

(65) Prior Publication Data

US 2016/0034824 A1    Feb. 4, 2016

(51) Int. Cl.
*G06F 15/18* (2006.01)
*G06N 99/00* (2019.01)
(Continued)

(52) U.S. Cl.
CPC ....... *G06N 99/005* (2013.01); *G06F 16/2237* (2019.01); *G06F 16/2477* (2019.01); *G06F 16/9537* (2019.01); *G06N 7/005* (2013.01)

(58) Field of Classification Search
CPC ...... G06N 99/005; G06N 5/025; G06N 7/005; G06K 9/6256; G06K 9/6269
(Continued)

(56) References Cited

U.S. PATENT DOCUMENTS 8,131,472 B2   3/2012 Chow et al.
8,255,346 B2 *  8/2012 Abe ................ G06N 7/005
                                                   703/13
(Continued)

OTHER PUBLICATIONS

List of IBM Patents or Patent Applications Treated as Related; (Appendix P), Filed Sep. 25, 2014; 2 pages.
(Continued)

*Primary Examiner* — Eric Nilsson
*Assistant Examiner* — Viker A Lamardo
(74) *Attorney, Agent, or Firm* — Cantor Colburn LLP; Daniel Morris

(57) ABSTRACT

A method and system to perform spatio-temporal prediction are described. The method includes obtaining, based on communication with one or more sources, multi-scale spatial datasets, each of the multi-scale spatial datasets providing a type of information at a corresponding granularity, at least two of the multi-scale spatial datasets providing at least two types of information at different corresponding granularities. The method also includes generating new features for each of the multi-scale spatial datasets, the new features being based on features of each of the multi-scale spatial datasets and spatial relationships between and within the multi-scale spatial datasets. The method further includes selecting, using the processor, features of interest from among the new features, training a predictive model based on the features of interest, and predicting an event based on the predictive model.

20 Claims, 6 Drawing Sheets

(51) Int. Cl.
*G06N 7/00* (2006.01)
*G06F 16/22* (2019.01)
*G06F 16/2458* (2019.01)
*G06F 16/9537* (2019.01)

(58) Field of Classification Search
USPC .......................................................... 706/12
See application file for complete search history.

(56) References Cited

U.S. PATENT DOCUMENTS

| | | | | |
|---|---|---|---|---|
| 9,177,259 | B1* | 11/2015 | Levchuk | G06N 99/005 |
| 2007/0294284 | A1* | 12/2007 | Evans | G06F 17/30241 |
| 2011/0153419 | A1* | 6/2011 | Hall, III | G06Q 10/067 |
| | | | | 705/14.52 |
| 2012/0284280 | A1* | 11/2012 | Kumar | G06Q 10/06 |
| | | | | 707/743 |
| 2014/0180722 | A1* | 6/2014 | Lynn | G06Q 10/00 |
| | | | | 705/3 |
| 2014/0279786 | A1* | 9/2014 | Grokop | G06F 1/3234 |
| | | | | 706/46 |
| 2015/0347918 | A1* | 12/2015 | Lucey | G06N 5/048 |
| | | | | 706/12 |

OTHER PUBLICATIONS

Wei Shan Dong et al., "Identification of Time Lagged Indicators for Events With a Window Period", U.S. Appl. No. 14/496,002, filed Sep. 25, 2014.
ArcGIS Desktop 9.2, "Functionality Matrix", ESRI, 2006, pp. 1-3.
Bogorny et al., "Spatial and Spatio-Temporal Data Mining", IEEE International Conference on Data Mining, 2010, 1 page.
Shekhar et al., "Spatial and Spatiotemporal Data Mining: Recent Advances", IEEE International Conference on Data Mining, 2010, pp. 1-34.
List of IBM Patents or Patent Applications Treated as Related; (Appendix P), filed Aug. 4, 2014; 2 pages.
Arun Hampapur et al., "Characterizing Relationships Among Spatio-Temporal Events", U.S. Appl. No. 14/450,792, filed Aug. 4, 2014.
IBM, "IBM Crime Information Warehouse—Unlocking data to fight crime", IBM Information Management Software, 2005, pp. 1-2.
IBM, "Public safety: from "sense and respond" to "predict and act"", IBM Software Business Analytics, 2010, pp. 1-8.

* cited by examiner

AUTO-ANALYZING SPATIAL RELATIONSHIPS IN MULTI-SCALE SPATIAL DATASETS FOR SPATIO-TEMPORAL PREDICTION

BACKGROUND

The present invention relates to event prediction, and more specifically, to auto-analyzing spatial relationships in multi-scale spatial datasets for spatio-temporal prediction.

Spatio-temporal data refers to data that provides information about both space (location) and time. The spatial data may be available at different resolutions or scales. That is, for example, population information may be available at the scale or granularity of a city while power outage information may be available at a street level or scale. With the increased use of technology such as global positioning system (GPS) receivers, that provide location information associated with time, data analytics with spatio-temporal data and applications of the data analytics are increasing. One such application of spatio-temporal data analytics is for event prediction or spatio-temporal prediction, which predicts the time and area range of an event. Exemplary spatio-temporal prediction pertains to likelihood of crime, traffic congestion, and epidemic spread characterization.

SUMMARY

According to one embodiment of the present invention, a method of performing a spatio-temporal prediction includes obtaining, based on communication with one or more source, multi-scale spatial datasets, each of the multi-scale spatial datasets providing a type of information at a corresponding granularity, at least two of the multi-scale spatial datasets providing at least two types of information at different corresponding granularities; generating, using a processor, new features for each of the multi-scale spatial datasets, the new features being based on features of each of the multi-scale spatial datasets and spatial relationships between and within the multi-scale spatial datasets; selecting, using the processor, features of interest from among the new features; training a predictive model based on the features of interest; and predicting an event based on the predictive model.

According to another embodiment, a system to perform spatio-temporal prediction includes an input interface configured to receive multi-scale spatial datasets from one or more sources, each of the multi-scale spatial datasets providing a type of information at a corresponding granularity, at least two of the multi-scale spatial datasets providing at least two types of information at different corresponding granularities; and a processor configured to generate new features for each of the multi-scale spatial datasets, the new features being based on features of each of the multi-scale spatial datasets and spatial relationships between and within the multi-scale spatial datasets, to select features of interest from among the new features, to train a predictive model based on the features of interest, and to predict an event based on the predictive model.

According to yet another embodiment, a computer program product includes instructions that, when processed by a processor, cause the processor to implement a method of performing spatio-temporal prediction. The method includes obtaining, from one or more sources, multi-scale spatial datasets, each of the multi-scale spatial datasets providing a type of information at a corresponding granularity, at least two of the multi-scale spatial datasets providing at least two types of information at different corresponding granularities; generating new features for each of the multi-scale spatial datasets, the new features being based on features of each of the multi-scale spatial datasets and spatial relationships between and within the multi-scale spatial datasets; selecting features of interest from among the new features; training a predictive model based on the features of interest; and predicting an event based on the predictive model.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

As noted above, spatio-temporal data may be used for event prediction. As also noted, the spatial data may be multi-scale, meaning that each dataset has a different geographic granularity or resolution. To be clear, scale, granularity, resolution, and level all refer to the minimum area to which a dataset pertains in the context of the embodiments discussed herein. Further, a layer is used to refer to a spatial layer or scale such that more than one dataset may be associated with the same layer. As an example, population information may be provided on a city scale (where the smallest granularity of the population dataset is a city). In that case, a dataset of population information would be a layer of data with multiple population information units pertaining to different cities. Current prediction systems use data at various scales but cannot take advantage of features of spatial data at different scales without, for example, mapping spatial data (providing one type of information) at a given scale into the spatial boundary of the other spatial layer (associated with data providing a different type of information at a different scale). A geographically weighted regression may be used for example, that weights the different information available at a given scale differently. For example, different features (e.g., temperature, humidity) associated with weather data may be weighted differently, but features at different scales are not considered. As a result, previous methods fail to consider spatially sensitive factors. Embodiments of the systems and method described herein relate to spatio-temporal prediction that accounts for spatial relationships between datasets available at different scales. Specifically, the embodiments relate to automatically analyzing spatial relationships of spatial layers both across layers and within each layer, generating features that are spatial-relationship based, and selecting spatially sensitive features (selecting features with the most spatial correlation and filtering out features with too much or too little spatial variance).

Figure 1:
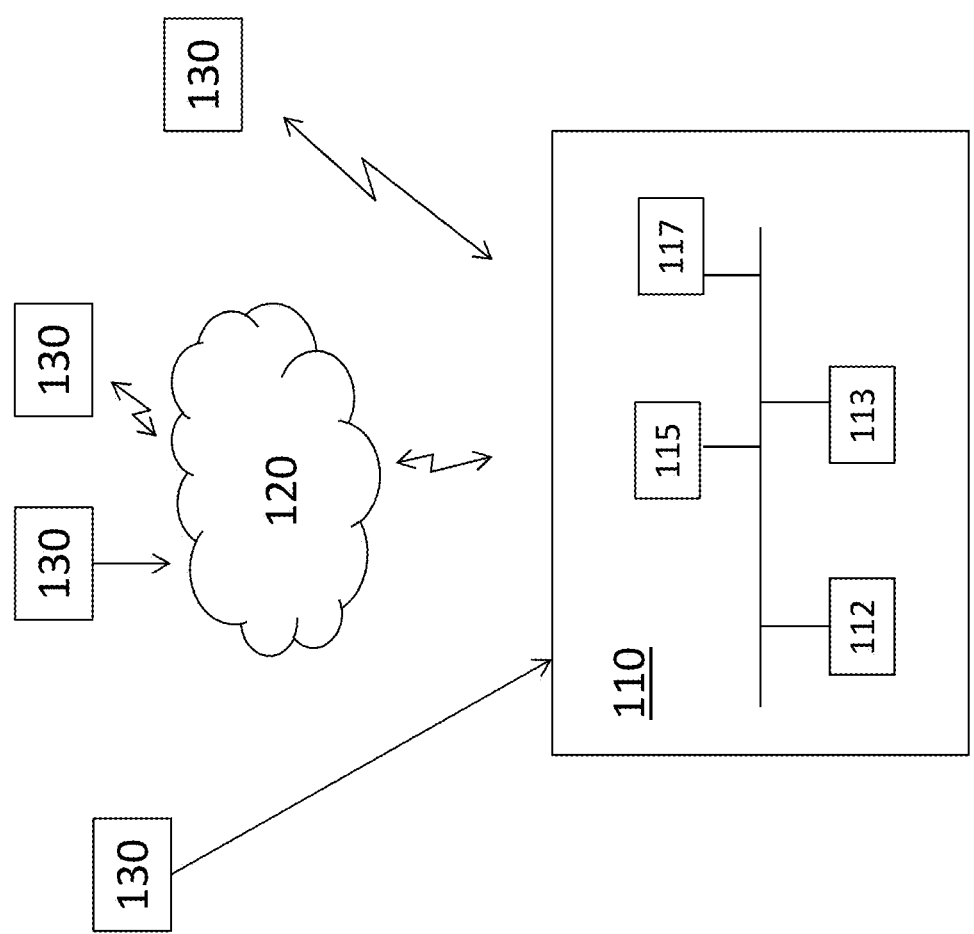
FIG. 1 is a block diagram of a system to perform spatio-temporal prediction according to embodiments of the invention.

FIG. 1 is a block diagram of a system 110 to perform spatio-temporal prediction according to embodiments of the invention. The system 110 receives data from various sources 130 at various scales (multi-scale spatial datasets). For example, when the system 110 is used to predict likelihood of crime, the sources 130 may be used by the system 110 to obtain weather information on a city scale, crime records for zones within each city, census information (e.g., population, income) on a block level within each city, and pawn shop locations on a street level. The sources 130 may communicate with the system 110 directly or through a network 120 wirelessly or through cables. The system 110 includes an input interface 112 to communicate with the various sources 130 and a user of the system via a keyboard or touchscreen, for example. The system 110 also includes one or more memory devices 113, one or more processors 115, and an output interface 117. The output interface 117 may include, for example, a monitor or a transmitter to send the prediction information to another system. The components of the system 110 may be coupled directly or through one or more busses. The processes implemented by the one or more processors 115 of the system 110 to generate a spatio-temporal prediction are discussed below.

Figure 2:
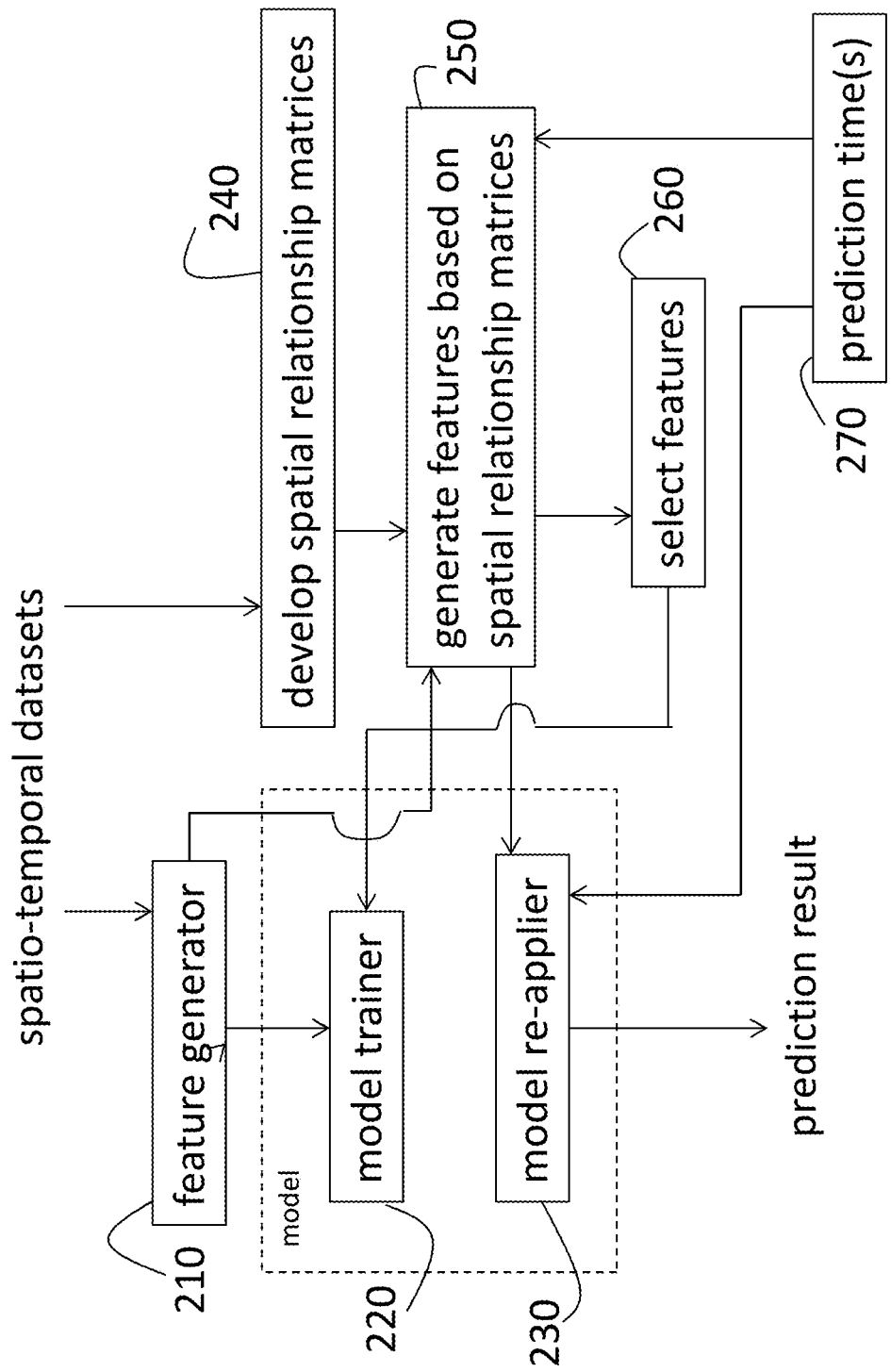
FIG. 2 is a flow diagram of performing spatio-temporal prediction according to an embodiment of the invention.

FIG. 2 is a flow diagram of performing spatio-temporal prediction according to an embodiment of the invention. The one or more processors 115 of the system 110 perform the processes based on spatio-temporal datasets obtained from the sources 130 and instructions stored in the one or more memory devices 113. Generally, blocks 210, 220, and 230 represent processes of a known prediction system, but the inputs those processes receive are changed according to embodiments detailed herein. At block 210, features are generated from the spatio-temporal datasets, the features are used to train a model at block 220, and the model is reapplied at block 230 based on specified prediction times at block 270 to output the prediction result. [The feature generation at block 210 in the known prediction system referred to features at the same scale. That is, as noted above, datasets at different scales could not be used together unless one dataset was mapped into the scale of the other. Thus, once a scale was selected for the prediction result, features from datasets that were only available at a scale other than the selected scale could not be used in training the model (block 220) in the known prior prediction systems. The features refer to elements of a dataset that are factors in the prediction. For example, when the prediction is a prediction of the probability of crime and weather is one of the available datasets, temperature may be a feature (i.e., increased crime may be related to temperatures over 90° Fahrenheit (° F.), for example. Humidity may be another feature that is part of the same weather dataset.

The embodiments detailed herein with reference to blocks 240, 250, and 260 relate to facilitating the use of features of datasets at every available scale in the training (220) and re-application (230) of the model. At block 240, spatio-temporal datasets available from the sources 130 (which may then be stored locally by the system 110 in one or more memory devices 113) are processed to develop spatial relationship matrices that reflect relationships among datasets at different levels and within each level. Generating new features based on the spatial relationship matrices, at block 250, facilitates selecting features in consideration of spatial sensitivity at block 260. These so-called spatially sensitive features, which are further discussed below, are provided to the model training process at block 220. The spatial relationship-based features generated at block 250 are also provided to the model re-application process (block 230). Each of the processes at blocks 240, 250, and 260 is detailed below.

At block 240, developing spatial relationship matrices includes developing relationships across and within levels of the multi-scale datasets as detailed herein. For example, given a dataset of M units or units $U_i$ (where i is 1 to M) at spatial layer L1 and another dataset of N units or units $U'_j$ (where j is 1 to N) at spatial layer L2, determining the spatial relationship between a unit $U_i$ in layer L1 and a unit $U'_j$ in layer L2 includes determining the distributing probability of $U_i$ onto $U'_j$ as:

$$P_{i \to j} = \frac{\text{size}(U_i \cap U'_j)}{\text{size}(U_i)} \qquad [\text{EQ. 1}]$$

The size of the intersection (represented by $\cap$) of the units in the L1 and L2 layers is divided by the size of the unit in the L1 layer in EQ. 1. This distributing probability is determined for every pair of $U_i$ and $U'_j$ in layers L1 and L2 to obtain the spatial relationship matrix at block 240. That is, a distributing graph $G_{L1 \to L2}$ is formed, keeping the probabilities greater than zero, and the distributing probabilities are stored in a distributing matrix $M_{L1 \to L2}$, as detailed below.

Figure 3:
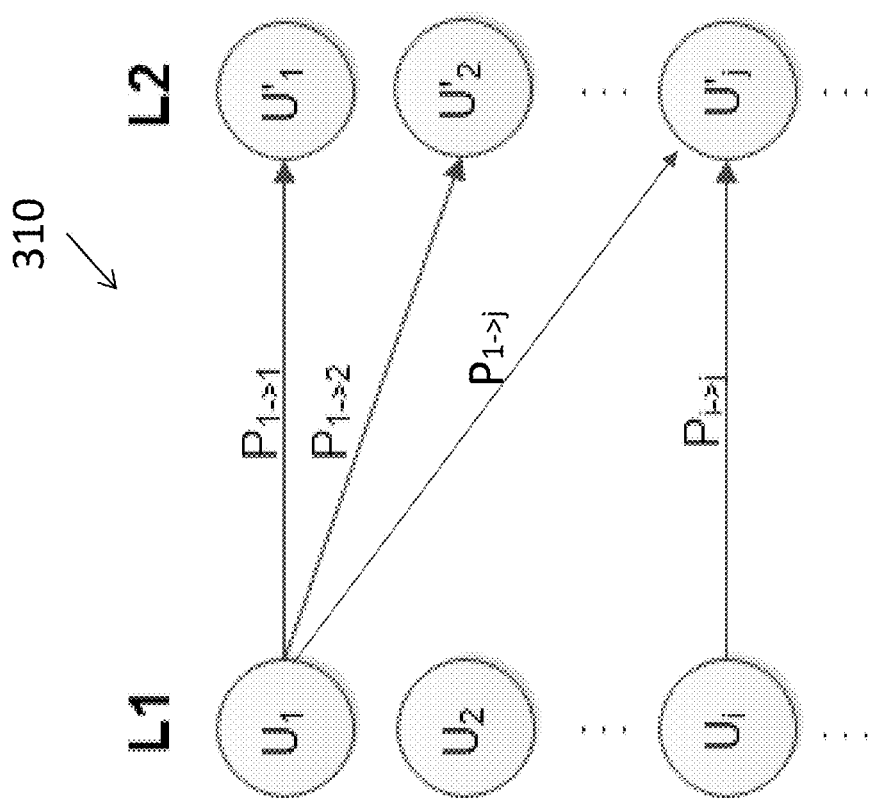
FIG. 3 illustrates an exemplary distributing graph $G_{L1->L2}$ developed in accordance with an embodiment of the invention.

FIG. 3 illustrates an exemplary distributing graph $G_{L1 \to L2}$ 310 developed in accordance with an embodiment of the invention. The exemplary layers L1 and L2 including M and N units, respectively, that are discussed above are shown in the distributing graph 310. The associated distributing matrix $M_{L1 \to L2}$ is given by:

$$M_{L1 \to L2} = \begin{bmatrix} P_{1 \to 1} & \cdots & P_{1 \to N} \\ \vdots & \ddots & \vdots \\ P_{M \to 1} & \cdots & P_{M \to N} \end{bmatrix} \qquad [\text{EQ. 2}]$$

As EQ. 2 shows, the distributing matrix $M_{L1 \to L2}$ is an M-by-N matrix. The process discussed above could be used vise versa to develop $M_{L2 \to L1}$, as illustrated with reference to FIG. 4 below.

Figure 4:
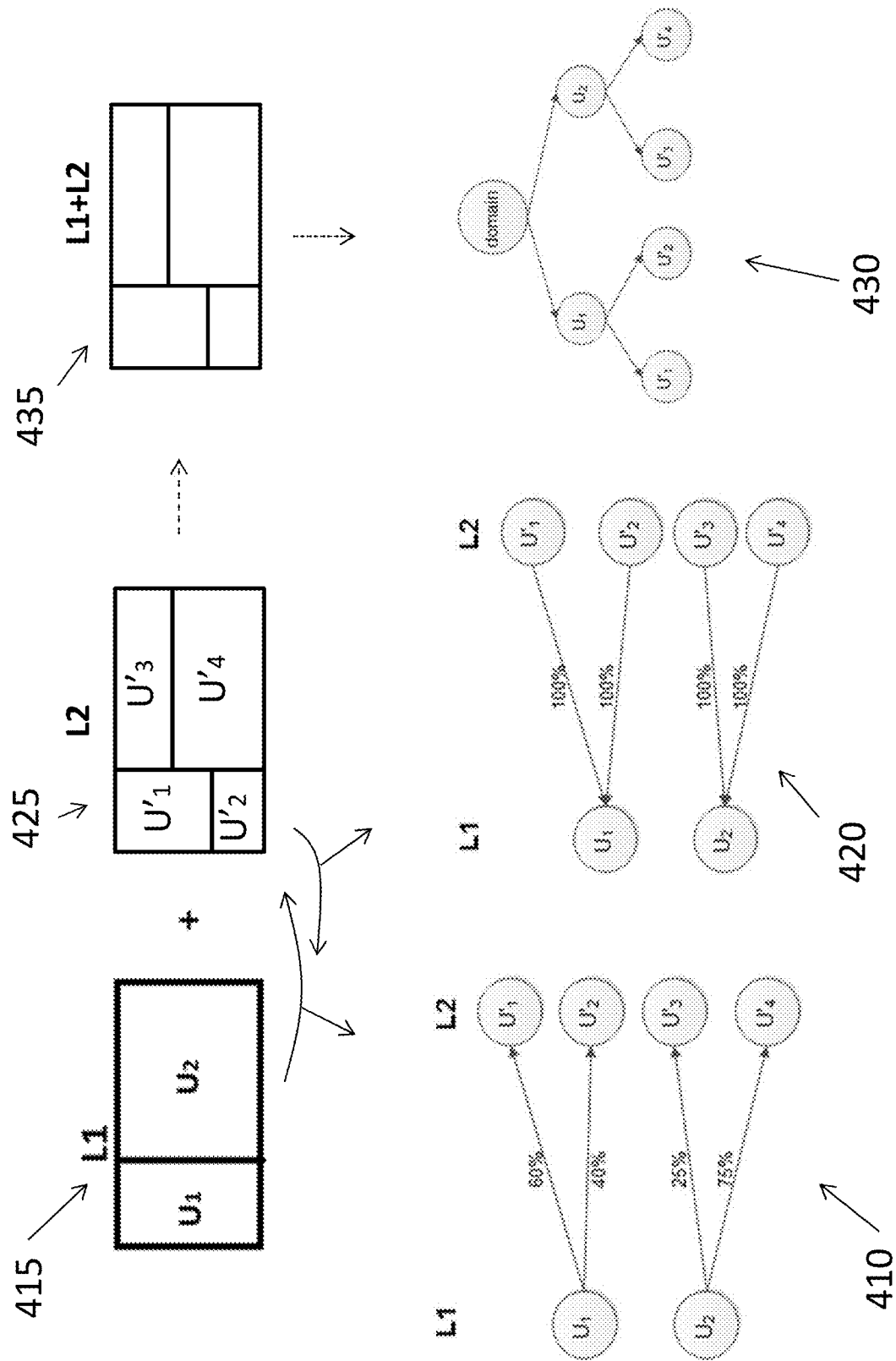
FIG. 4 illustrates exemplary distributing graphs $G_{L1->L2}$ and $G_{L2->L1}$ and an equivalent hierarchical representation for exemplary spatial layers L1 and L2 of two datasets and illustrates a combined layer corresponding with a hierarchical representation according to an embodiment of the invention.

FIG. 4 illustrates exemplary distributing graphs $G_{L1 \to L2}$ 410 and $G_{L2 \to L1}$ 420 and an equivalent hierarchical representation 430 for exemplary spatial layers L1 415 and L2 425 of two datasets and illustrates a combined layer 435 corresponding with a hierarchical representation 430 according to an embodiment of the invention. As shown in FIG. 4, layer L1 415 includes two units ($U_1$, $U_2$), and layer L2 425 includes four units ($U'_1$ through $U'_4$) in the same spatial boundary. For example, units $U_1$ and $U_2$ may correspond to populations of two cities, and units $U'_1$, $U'_2$, $U'_3$, and $U'_4$ may correspond to crime histories of four zones. The datasets may be provided so that the system 110 may predict likelihood of crime (the system 110 may train a model to output predictions based on requests). In the illustrated exemplary case, as shown by the combined layer 435, which is a combination of layers L1 415 and L2 425, units $U'_1$ and $U'_2$ of layer L2 425 occupy the same spatial boundary as unit $U_1$ in layer L1 415, and units $U'_3$ and $U'_4$ in layer L2 425 occupy the same spatial boundary as unit $U_2$ of layer L1 415. That is, in the example, zones corresponding with units $U'_1$ and $U'_2$ are part of the city corresponding with unit $U_1$, and zones corresponding with units $U'_3$ and $U'_4$ are part of the city corresponding with $U_2$.

This relationship is reflected in the distributing graphs $G_{L1->L2}$ 410 and $G_{L2->L1}$ 420, which show the distributing probability values for each pair of units. As the distributing graph $G_{L1->L2}$ 410 shows, the distributing probability of $U_1$ (layer L1 415) onto $U'_1$ (layer L2 425) is 60 percent (%) (60% of the spatial size of $U_1$ is occupied by $U'_1$), while the distributing probability of $U_2$ onto $U'_4$ is 75% (75% of the spatial size of $U_2$ is occupied by $U'_4$). The distributing matrix $M_{L1->L2}$ associated with the distributing graph $G_{L1->L2}$ 410 is:

$$M_{L1 \to L2} = \begin{bmatrix} 60\% & 40\% & 0 & 0 \\ 0 & 0 & 25\% & 75\% \end{bmatrix} \quad [\text{EQ. 3}]$$

In this case, M (number of units in layer L1 415) is 2, and N (number of units in layer L2 425) is 4. Thus, the distributing matrix $M_{L1->L2}$ is a two-by-four matrix. The distributing graph $G_{L2->L1}$ 420 indicates the distributing probability of units of the layer L2 425 onto units of the layer L1 415. In this case, each of the distributing probabilities is 100%. That is, all of units $U'_1$ and $U'_2$ are within the spatial boundary of unit $U_1$, and all of units $U'_3$ and $U'_4$ are within the spatial boundary of unit $U_2$. The equivalent hierarchical representation 430 reflects this relationship. Based on this spatial relationship, the corresponding distributing matrix $M_{L2->L1}$ is given by:

$$M_{L2 \to L1} = \begin{bmatrix} 100\% & 0 \\ 100\% & 0 \\ 0 & 100\% \\ 0 & 100\% \end{bmatrix} \quad [\text{EQ. 4}]$$

As EQ. 4 indicates, the distributing probabilities of $U'_1$ and $U'_2$ onto $U_2$ are 0 (no portion of $U'_1$ and $U'_2$ is within the spatial boundary of $U_2$), and the distributing probabilities of $U'_3$ and $U'_4$ onto $U_1$ are 0 (no portion of $U'_1$ and $U'_2$ is within the spatial boundary of $U_1$). Because layer L2 425 includes four units and layer L1 415 includes two units, the distributing matrix $M_{L2->L1}$ is a four-by-two matrix.

Figure 5:
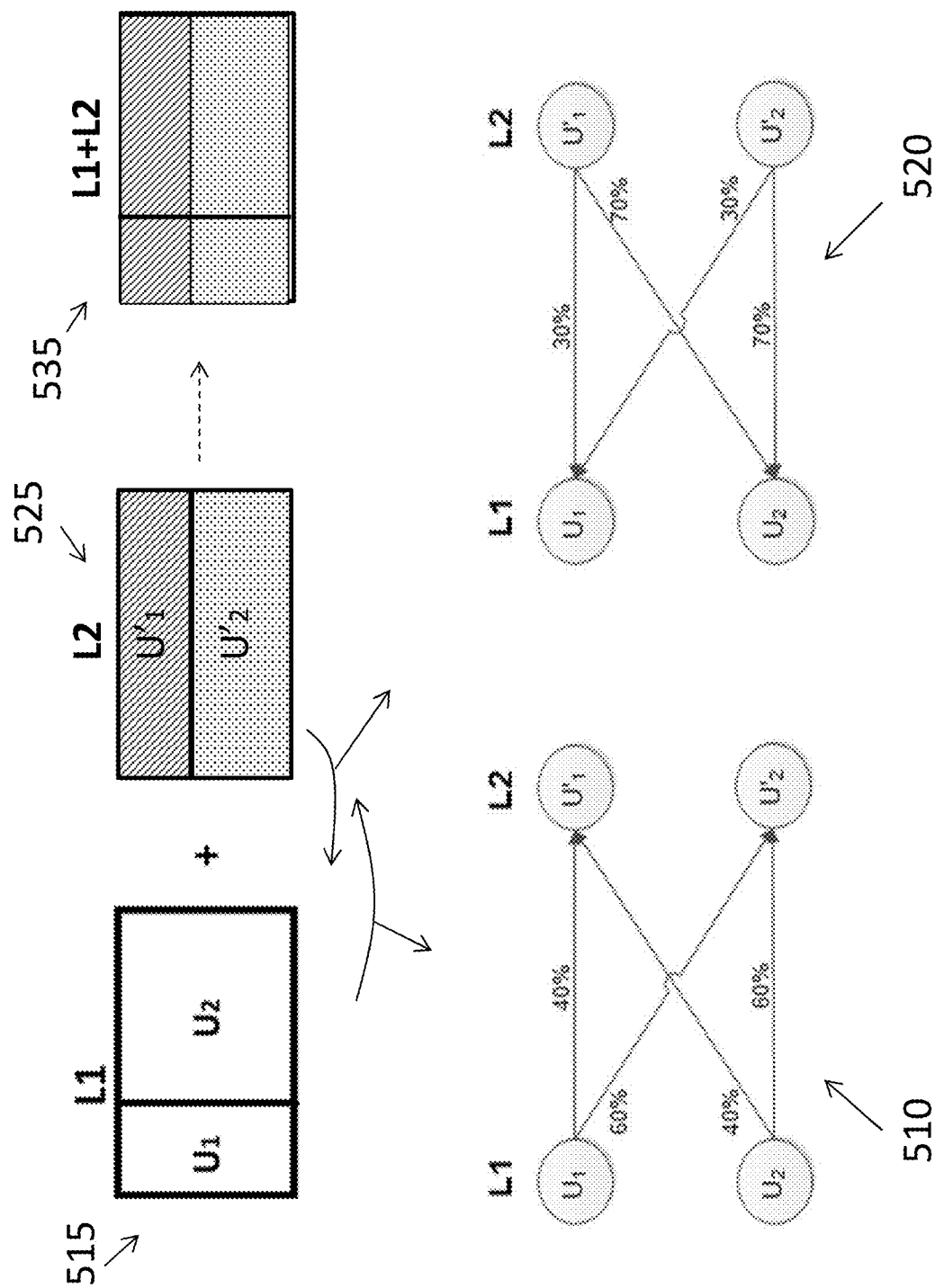
FIG. 5 illustrates exemplary distributing graphs $G_{L1->L2}$ and $G_{L2->L1}$ for exemplary spatial layers L1 and L2 of two datasets, shown together in a combined layer according to an embodiment of the invention.

FIG. 5 illustrates exemplary distributing graphs $G_{L1->L2}$ 510 and $G_{L2->L1}$ 520 for exemplary spatial layers L1 515 and L2 525 of two datasets, shown together in a combined layer 535 according to an embodiment of the invention. FIG. 5 is an illustration of a slightly more complicated scenario than the one shown in FIG. 4, because the spatial boundaries of each of the units in each of the layers L1 515 and L2 425 overlap. This is illustrated by the combined layer 535 which shows the intersection of the units of each of the layers L1 515 and L2 525. In an exemplary case, units $U_1$ and $U_2$ in layer L1 515 may each correspond to a number of affected patients within a hospital coverage area, and units $U'_1$ and $U'_2$ in layer L2 525 may correspond with populations of municipalities. The datasets may be obtained from sources 130 so that the system 110 may predict characteristics of the spread of an epidemic. The distributing graph $G_{L1->L2}$ 510 indicates the distributing probability of each of the units $U_1$ and $U_2$ onto each of the units $U'_1$ and $U'_2$. The corresponding distributing matrix $M_{L1->L2}$ is given by:

$$M_{L1 \to L2} = \begin{bmatrix} 40\% & 60\% \\ 40\% & 60\% \end{bmatrix} \quad [\text{EQ. 5}]$$

Because the number of units M in the layer L1 515 and the number of units N in the layer L2 525 are both two, the distributing matrix $M_{L1->L2}$ is a two-by-two matrix. The distributing matrix $M_{L1->L2}$ indicates that the distributing probability of both $U_1$ onto $U'_1$ and $U_2$ onto $U'_1$ is 40% (40% of the spatial area of $U_1$ and 40% of the spatial area of $U_2$ intersects with $U'_1$), and the distributing probability of both $U_1$ onto $U'_2$ and $U_2$ onto $U'_2$ is 60% (60% of the spatial area of $U_1$ and 60% of the spatial area of $U_2$ intersects with $U'_2$). The distributing graph $G_{L2->L1}$ 520 indicates the distributing probability of each of the units $U'_1$ and $U'_2$ onto each of the units $U_1$ and $U_2$. The corresponding distributing matrix $M_{L2->L1}$ is given by:

$$M_{L2 \to L1} = \begin{bmatrix} 30\% & 70\% \\ 30\% & 70\% \end{bmatrix} \quad [\text{EQ. 6}]$$

The distributing matrix $M_{L2->L1}$ indicates that the distributing probability of both $U'_1$ onto $U_1$ and $U'_2$ onto $U_1$ is 30% (30% of the spatial area of $U'_1$ and 30% of the spatial area of $U'_2$ intersects with $U_1$), and the distributing probability of both $U'_1$ onto $U_2$ and $U'_2$ onto $U_2$ is 70% (70% of the spatial area of $U'_1$ and 70% of the spatial area of $U'_2$ intersects with $U_2$).

Continuing with the discussion of processes at block 240 of FIG. 2, spatial relationships within each layer associated with each of the datasets are also characterized in matrix form. While each of the inter-layer spatial relationships results in two distributing matrices ($M_{L1->L2}$ and $M_{L2->L1}$), as discussed above, the intra-layer spatial relationships may result in more than two matrices of two types. The two types of matrices discussed below are a binary matrix and a continuous matrix. For a layer with N spatial units, the (intra-layer) spatial relationship among the N spatial units is represented by an N-by-N matrix. Table 1 provides exemplary relationship types that may be indicated by a binary matrix:

TABLE 1

Exemplary binary matrix types.

| Relationship Type | sign($u_i$, $u_j$) = 1 | sign($u_i$, $u_j$) = 0 |
|---|---|---|
| neighborhood | units i and j are neighbors | units i and j are not neighbors |
| directly connected | units i and j are directly connected by city roads | units i and j are not directly connected by city roads |
| blocking-up | units i and j blocked up by rivers/mountains | units i and j are not blocked up by rivers/mountains |
| Euclidian distance (ED) within 1 kilometer (km) | ED between units i and j is within 1 km | ED between units i and j is not within 1 km |
| path distance (PD) within 1 km | PD between units i and j is within 1 km | PD between units i and j is not within 1 km |

The N-by-N matrix $M_{sign}$, which may indicate one of the relationship types indicated in Table 1 or other binary relationships, is given by:

$$M_{sign} = \begin{bmatrix} 1 & sign(u_1, u_2) & sign(u_1, u_3) & \ldots & sign(u_1, u_n) \\ sign(u_2, u_1) & 1 & sign(u_2, u_3) & \ldots & sign(u_2, u_n) \\ sign(u_3, u_1) & sign(u_3, u_2) & 1 & \ldots & \vdots \\ \vdots & \ldots & \ldots & \ddots & \vdots \\ sign(u_n, u_1) & \ldots & \ldots & \ldots & 1 \end{bmatrix}$$ [EQ. 7]

Table 2 provides exemplary relationship types that may be indicated by a continuous matrix:

TABLE 2

Exemplary continuous matrix types.

| Relationship Type | dist($u_i$, $u_j$) |
|---|---|
| Euclidean distance | Euclidean distance between units i and j |
| path distance | path or road distance between units i and j |
| obstruction distance | distance between units i and j when detouring obstructions (river/mountain) |

The N-by-N matrix $M_{dist}$, which may indicate one of the relationship types indicated in Table 2 or other continuous relationships, is given by:

$$M_{dist} = \begin{bmatrix} 0 & dist(u_1, u_2) & dist(u_1, u_3) & \ldots & dist(u_1, u_n) \\ dist(u_2, u_1) & 0 & dist(u_2, u_3) & \ldots & dist(u_2, u_n) \\ dist(u_3, u_1) & dist(u_3, u_2) & 0 & \ldots & \vdots \\ \vdots & \ldots & \ldots & \ddots & \vdots \\ dist(u_n, u_1) & \ldots & \ldots & \ldots & 0 \end{bmatrix}$$ [EQ. 8]

Figure 6:
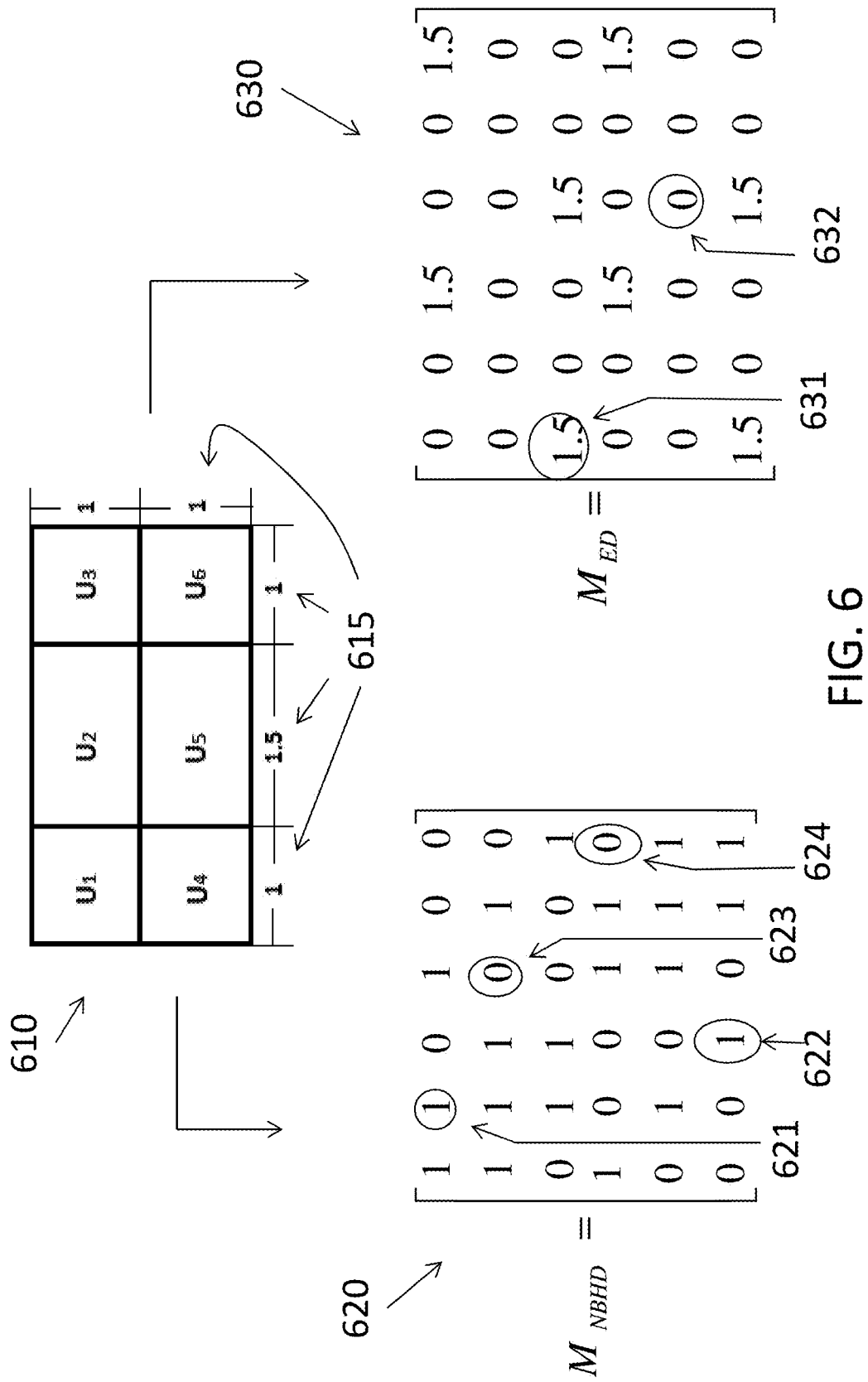
FIG. 6 illustrates an exemplary spatial layer and a binary relationship matrix and a continuous matrix derived from the spatial layer according to an embodiment of the invention.

FIG. 6 illustrates an exemplary spatial layer 610 and a binary relationship matrix 620 and a continuous matrix 630 derived from the spatial layer 610 according to an embodiment of the invention. The exemplary spatial layer 610 includes six units U1 through U6 with exemplary distances (unit spatial boundary lengths 615) shown. The exemplary binary relationship matrix 620 is a binary neighborhood relationship matrix ($M_{NBHD}$) that indicates whether two units are neighbors. Thus, for example, result 621, which is sign($U_1$,$U_2$), and result 622, which is sign($U_6$,$U_3$), are both 1, because $U_1$ and $U_2$ are neighbors and $U_6$ and $U_3$ are neighbors, as shown by the spatial layer 610. As another example, results 623, which is sign($U_2$,$U_4$), and result 624, which is sign($U_4$,$U_6$) are both 0, because $U_2$ and $U_4$ are not neighbors and $U_4$ and $U_6$ are not neighbors, as shown by the spatial layer 610. The exemplary continuous relationship matrix 630 is a continuous Euclidean distance matrix ($M_{ED}$) that indicates the Euclidean distance between two units. Thus, for example, result 631, which is dist($U_3$,$U_1$) is 1.5, because the Euclidean distance between $U_3$ and $U_1$ is 1.5, as shown by the spatial layer 610. As another example, result 632, which is dist($U_5$,$U_4$) is 0, because the Euclidean distance between $U_5$ and $U_4$, which are neighbors, is 0, as shown by the spatial layer 610.

Turning now to the process at block 250 (FIG. 2), generating features based on the spatial relationship matrices discussed above is detailed below. Based on the discussion detailing the process at block 240 above, it should be clear that both inter-layer and intra-layer spatial relationship matrices must be considered in generating features. As noted above, a feature is a factor that affects the prediction. A dataset (layer of information at a given scale) may include one or more features. Generating features based on inter-layer spatial relationship matrices is discussed first. Two layers L1 and L2 with M and N spatial units, respectively, are assumed again. As discussed with reference to FIG. 2, features are generated for each layer at block 210. These features are used as detailed below to generate new features based on the spatial relationship matrices developed at block 240 (FIG. 2). Assuming, for the sake of example, that the dataset of layer L2 includes features A, B, and C (generated at block 210, FIG. 2), where $A_i$ is a value of the feature A of unit i in L2, $B_i$ is a value of the feature B of unit i in L2, and $C_i$ is a value of the feature C in unit i of L2, and using the distributing matrix $M_{L1 \rightarrow L2}$, which indicates the spatial relationship between L1 and L2, new features GA, GB, and GC are generated in layer L1 as:

$$\begin{bmatrix} GA_1 & GB_1 & GC_1 \\ GA_2 & GB_2 & GC_2 \\ \vdots & \vdots & \vdots \\ GA_M & GB_M & GC_M \end{bmatrix} = Fun(M_{L1 \rightarrow L2}) \times \begin{bmatrix} A_1 & B_1 & C_1 \\ A_2 & B_2 & C_2 \\ \vdots & \vdots & \vdots \\ A_N & B_N & C_N \end{bmatrix}$$ [EQ. 9]

In alternate embodiments, any number (one or more) features may be part of a dataset layer. Fun(M) is a function on the distributing matrix. Because the distributing matrix $M_{L1 \rightarrow L2}$ is an M-by-N matrix, the output of the Fun(M) is also an M-by-N matrix. The new feature matrix in layer L1 is an M-by-(the number of features in Layer L2) matrix, as shown by EQ. 9. Based on the type of feature, different matrix functions may be used. For example, if the feature were house density, Fun(M)=M. That is, the distributing matrix itself would be multiplied by the matrix of feature values. If the feature were number of unemployed, for example, Fun(M) may be given by:

$$Fun\left(\begin{bmatrix} a_{1,1} & \cdots & a_{1,N} \\ \vdots & \ddots & \vdots \\ a_{M,1} & \cdots & a_{M,N} \end{bmatrix}\right) = \begin{bmatrix} \text{sign}(a_{1,1} > 0) & \cdots & \text{sign}(a_{1,N} > 0) \\ \vdots & \ddots & \vdots \\ \text{sign}(a_{M,1} > 0) & \cdots & \text{sign}(a_{M,N} > 0) \end{bmatrix}$$  [EQ. 10]

The output of Fun(M) is a binary matrix, because sign(a>0) is 1 when a is greater than 0 and sign(a>0) is 0 when a is not greater than 0. The value of a is the distributing probability. That is, when M is $M_{L1 \rightarrow L2}$, the distributing probability of each unit of L1 onto each unit of L2 is each value of a, as discussed above. If the feature were average income, for example, Fun(M) may be given by:

$$Fun\left(\begin{bmatrix} a_{1,1} & \cdots & a_{1,N} \\ \vdots & \ddots & \vdots \\ a_{M,1} & \cdots & a_{M,N} \end{bmatrix}\right) =$$  [EQ. 11]

$$\begin{bmatrix} \text{sign}(a_{1,1} = \max(a_{1,1}, \ldots, a_{1,N})) & \cdots & \text{sign}(a_{1,N} = \max(a_{1,1}, \ldots, a_{1,N})) \\ \vdots & \ddots & \vdots \\ \text{sign}(a_{M,1} = \max(a_{M,1}, \ldots, a_{M,N})) & \cdots & \text{sign}(a_{M,N} = \max(a_{M,1}, \ldots, a_{M,N})) \end{bmatrix}$$

When M is $M_{L1 \rightarrow L2}$, the highest distributing probability of each row of the M-by-N matrix keeps the value 1 and all other matrix elements take the value 0.

Generating features (block 250, FIG. 2) based on intra-layer spatial relationship matrices is discussed next. An exemplary layer L2 with N spatial units is considered for explanatory purposes. As discussed above, one or more N-by-N matrices would have been developed (at block 240, FIG. 2). Each of the one or more N-by-N matrices may be of a binary type or a continuous type. For example, L2 may have matrices $M_{NBHD}$, $M_{connect}$, $M_{ED}$, and $M_{PD}$ associated with it. $M_{NBHD}$ is a binary type matrix indicating whether each pair of units is neighbors, $M_{connect}$ is a binary type matrix indicating whether each pair of units is directly connected, $M_{ED}$ is a continuous type matrix indicating the Euclidean distance between each pair of units, and $M_{PD}$ is a continuous type matrix indicating a path distance between each pair of units. In addition, exemplary layer L2 may have features A, B, and C, where $A_i$ is a value of the feature A of unit i in L2, $B_i$ is a value of the feature B of unit i in L2, and $C_i$ is a value of the feature C in unit i of L2. Then new features for L2 may be generated as:

$$\begin{bmatrix} GA_1 & GB_1 & GC_1 \\ GA_2 & GB_2 & GC_2 \\ \vdots & \vdots & \vdots \\ GA_N & GB_N & GC_N \end{bmatrix} = Fun(M) \times \begin{bmatrix} A_1 & B_1 & C_1 \\ A_2 & B_2 & C_2 \\ \vdots & \vdots & \vdots \\ A_N & B_N & C_N \end{bmatrix}$$  [EQ. 12]

While three features are used in the example above, any number of features (one or more) may be available in a dataset. M is representative of the set of intra-layer matrices (e.g., $M_{NBHD}$, $M_{connect}$, $M_{ED}$, or $M_{PD}$) obtained for the layer (block 240, FIG. 2). Different matrix functions (Fun(M)) may be used based on the feature. For example, when a feature is business tax, then, with M={$M_{NBHD}$, $M_{connect}$, $M_{ED}$, $M_{PD}$}, $$Fun(M) = M_{NBHD}$$  [EQ. 13]

or $$Fun(M) = (M_{ED})^T$$  [EQ. 14]

As another example, when a feature is frequency crimes or special events, then $$Fun(M) = M_{NBHD} \times M_{connect}$$  [EQ. 15]

or Fun(M) may be given by EQ. 14 (a transform of the Euclidean distance matrix $M_{ED}$) again. The new features generated at block 250 based on the features at each level (block 210) and the spatial relationships (block 240) are used in re-applying the trained model (block 230), as well as in selecting spatially sensitive features (block 260), which is discussed below.

Once spatial relationship matrices have been developed (block 240, FIG. 2) and those matrices have been used to generate new features (block 250, FIG. 2), selecting features (block 260, FIG. 2) or selecting spatially sensitive features from among the new features is done as described below. Given all of the new features of a layer (generated on the basis of spatial relationship matrices corresponding with all the other layers at block 250, FIG. 2), features that are deemed to have too much or too little spatial variation are filtered out. The spatial variation of a given feature is measured based on spatial statistics. The range for the filter (the determination of what is too much and what is too little variation) may be based on known spatial testing methods (e.g., Variogram cloud, Moran scatterplot) so that features that exhibit spatial multi co-linearity may be filtered out. In alternate embodiments, the determination of too much or too little variation of a feature may be made on another basis related to the target of the prediction. Typically, in predictive models, multi co-linearity may lead to an over-counting type of bias leading to instability of the model. The importance of each remaining feature may be measured based on its spatial correlation to the target, such that selecting the so-called spatially sensitive features (block 260, FIG. 2) involves selecting features that exceed a threshold importance measure. The threshold may be determined for each event prediction application (e.g., crime, traffic congestion, epidemic spread characterization) as a tuning parameter prior to training the mode (block 220, FIG. 2).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method of performing spatio-temporal prediction, the method comprising:
    obtaining, based on communication with one or more sources, multi-scale spatial datasets, each of the multi-scale spatial datasets providing a type of information at a corresponding granularity, at least two of the multi-scale spatial datasets providing at least two different types of information at different corresponding granularities, wherein each granularity defines a minimum area to which the corresponding multi-scale spatial dataset corresponds;
    generating, using a processor, spatial relationships both between the multi-scale spatial datasets at the different corresponding granularities and within the multi-scale spatial datasets;
    generating, using the processor, features from each of the multi-scale spatial datasets, wherein each feature of each of the multi-scale spatial datasets is a unit of the multi-scale spatial dataset;
    generating, using the processor, new features for each of the multi-scale spatial datasets, the new features being based on the features of each of the multi-scale spatial datasets and the spatial relationships between and within the multi-scale spatial datasets;
    selecting, using the processor, features of interest from among the new features;
    training a predictive model based on the features of interest; and
    predicting an event based on the predictive model.

2. A method according to claim 1, wherein at least two of the multi-scale spatial datasets are in at least one pairing.

3. The method according to claim 2, further comprising developing the spatial relationship between each pairing of the multi-scale spatial datasets as a pair of distributing matrices.

4. The method according to claim 3, wherein the developing the spatial relationship between a pairing of a first dataset and a second dataset among the multi-scale spatial datasets, the first dataset including first units and the second dataset including second units, includes indicating a distributing probability of each of the first units onto each of the second units in one distributing matrix of the pair of distributing matrices and indicating a distributing probability of each of the second units onto each of the first units in another distributing matrix of the pair of distributing matrices.

5. The method according to claim 1, further comprising developing the spatial relationships within each of the multi-scale spatial datasets as binary or continuous matrices.

6. The method according to claim 4, wherein the developing the spatial relationship among each pair of units within a dataset of the multi-scale spatial datasets includes indicating, in the associated binary matrix, at least one of whether the pair of units are neighbors, whether the pair of units is directly connected, whether the pair of units is within a threshold Euclidean distance of each other, or whether the pair of units is within a threshold path distance of each other.

7. The method according to claim 4, wherein the developing the spatial relationship among each pair of units within a dataset of the multi-scale spatial datasets includes indicating, in the associated continuous matrix, at least one of a Euclidean distance between the pair of units, a path distance between the pair of units, or a distance between the pair of units when a detour around an obstruction must be taken.

8. The method according to claim 1, wherein the selecting the features of interest includes discarding from selection the new features with a spatial variation outside a predefined range.

9. The method according to claim 8, further comprising measuring an importance of each of the new features remaining after the discarding, the importance being based on a spatial correlation to a target of the spatio-temporal prediction.

10. A system to perform spatio-temporal prediction, the system comprising:
    an input interface configured to receive multi-scale spatial datasets from one or more sources, each of the multi-scale spatial datasets providing a type of information at a corresponding granularity, at least two of the multi-scale spatial datasets providing at least two different types of information at different corresponding granularities; and
    a processor configured to generate spatial relationships both between the multi-scale spatial datasets at the different corresponding granularities and within the multi-scale spatial datasets, to generate features from each of the multi-scale spatial datasets, wherein each feature of each of the multi-scale spatial datasets is a unit of the multi-scale spatial dataset, to generate new features for each of the multi-scale spatial datasets, the new features being based on the features of each of the multi-scale spatial datasets and the spatial relationships between and within the multi-scale spatial datasets, to select features of interest from among the new features, to train a predictive model based on the features of interest, and to predict an event based on the predictive model.

11. The system according to claim 10, wherein at least two of the multi-scale spatial datasets are in at least one pairing.

12. The system according to claim 11, wherein the processor develops the spatial relationship between each pairing of the multi-scale spatial datasets as a pair of distributing matrices.

13. The system according to claim 12, wherein the processor develops the spatial relationship between a pairing of a first dataset and a second dataset among the multi-scale spatial datasets, the first dataset including first units and the second dataset including second units, based on indicating a distributing probability of each of the first units onto each of the second units in one distributing matrix of the pair of distributing matrices and indicating a distributing probability of each of the second units onto each of the first units in another distributing matrix of the pair of distributing matrices.

14. The system according to claim 10, wherein the processor develops the spatial relationship within each of the multi-scale spatial datasets as binary or continuous matrices.

15. The system according to claim 14, wherein the processor develops the spatial relationship among each pair of units within a dataset of the multi-scale spatial datasets based on indicating, in the associated binary matrix, at least one of whether the pair of units are neighbors, whether the pair of units is directly connected, whether the pair of units is within a threshold Euclidean distance of each other, or whether the pair of units is within a threshold path distance of each other.

16. The system according to claim 14, wherein the processor develops the spatial relationship among each pair of units within a dataset of the multi-scale spatial datasets based on indicating, in the associated continuous matrix, at least one of a Euclidean distance between the pair of units, a path distance between the pair of units, or a distance between the pair of units when a detour around an obstruction must be taken.

17. The system according to claim 10, wherein the processor selects the features of interest based on discarding from selection the new features with a spatial variation outside a predefined range.

18. The system according to claim 17, further comprising measuring an importance of each of the new features remaining after the discarding, the importance being based on a spatial correlation to a target of the spatio-temporal prediction.

19. A non-transitory computer program medium comprising instructions that, when processed by a processor, cause the processor to implement a method of performing spatio-temporal prediction, the method comprising:
obtaining, from one or more sources, multi-scale spatial datasets, each of the multi-scale spatial datasets providing a type of information at a corresponding granularity, at least two of the multi-scale spatial datasets providing at least two different types of information at different corresponding granularities, wherein each granularity defines a minimum area to which the corresponding multi-scale spatial dataset corresponds;
generating spatial relationships both between the multi-scale spatial datasets at the different corresponding granularities and within the multi-scale spatial datasets;
generating features from each of the multi-scale spatial datasets, wherein each feature of each of the multi-scale spatial datasets is a unit of the multi-scale spatial dataset;
generating new features for each of the multi-scale spatial datasets, the new features being based on the features of each of the multi-scale spatial datasets and the spatial relationships between and within the multi-scale spatial datasets;
selecting features of interest from among the new features;
training a predictive model based on the features of interest; and
predicting an event based on the predictive model.

20. The computer program product according to claim 19, wherein the method further comprises developing the spatial relationship between at least one pairing of the multi-scale spatial datasets as a pair of distributing matrices, wherein
the developing the spatial relationship between a pairing of a first dataset and a second dataset among the multi-scale spatial datasets, the first dataset including first units and the second dataset including second units, includes indicating a distributing probability of each of the first units onto each of the second units in one distributing matrix of the pair of distributing matrices and indicating a distributing probability of each of the second units onto each of the first units in another distributing matrix of the pair of distributing matrices.

\* \* \* \* \*